United States Patent
Kang et al.

(10) Patent No.: US 9,794,918 B2
(45) Date of Patent: *Oct. 17, 2017

(54) METHOD FOR TRANSMITTING DEMODULATION REFERENCE SIGNALS IN WIRELESS COMMUNICATION SYSTEM AND TERMINAL USING SAME

(71) Applicant: LG ELECTRONICS INC., Seoul (KR)

(72) Inventors: Ji Won Kang, Anyang-si (KR); Jin Young Chun, Anyang-si (KR); Min Seok Noh, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,588

(22) Filed: May 3, 2016

(65) Prior Publication Data

US 2016/0249348 A1    Aug. 25, 2016

Related U.S. Application Data

(63) Continuation of application No. 14/234,963, filed as application No. PCT/KR2012/006023 on Jul. 27, 2012, now Pat. No. 9,350,397.

(Continued)

(51) Int. Cl.
*H04W 72/04* (2009.01)
*H04L 23/02* (2006.01)
(Continued)

(52) U.S. Cl.
CPC .......... *H04W 72/0413* (2013.01); *H04B 1/10* (2013.01); *H04L 5/0048* (2013.01);
(Continued)

(58) Field of Classification Search
None
See application file for complete search history.

(56) References Cited

U.S. PATENT DOCUMENTS 8,249,006 B2   8/2012   Qu et al.
8,259,602 B2   9/2012   Kim et al.
(Continued)

FOREIGN PATENT DOCUMENTS

EP    2 387 268 A1    11/2011
KR    10-2010-0118534 A    11/2010
(Continued)

OTHER PUBLICATIONS

ETRI, Remaining issues for downlink DMRS sequence initialization, Mar. 30, 2012, 3GPP TSG RAN WG1 Meeting #68bis.*
(Continued)

*Primary Examiner* — Tejis Daya
(74) *Attorney, Agent, or Firm* — Birch, Stewart, Kolasch & Birch, LLP

(57) ABSTRACT

A method of transmitting an uplink reference signal of a user equipment (UE) in a multi-node system is described. The method according to an embodiment includes receiving a synchronization signal from a node; receiving a parameter for a virtual cell identifier (ID) from the node; generating an uplink demodulation reference signal (DM-RS) using the parameter for the virtual cell ID; and transmitting the generated uplink DM-RS to the node. A physical cell ID is a cell ID obtained from the synchronization signal, and the (Continued)

parameter for the virtual cell ID is a parameter used for generating the uplink DM-RS in the replacement of the physical cell ID.

10 Claims, 10 Drawing Sheets

Related U.S. Application Data

(60) Provisional application No. 61/512,374, filed on Jul. 27, 2011.

(51) Int. Cl.

| | | |
|---|---|---|
| *H04B 1/10* | (2006.01) | |
| *H04W 56/00* | (2009.01) | |
| *H04W 4/00* | (2009.01) | |
| *H04L 5/00* | (2006.01) | |

(52) U.S. Cl.
CPC ............ *H04L 5/0053* (2013.01); *H04L 23/02* (2013.01); *H04W 4/005* (2013.01); *H04W 56/001* (2013.01); *H04W 56/0035* (2013.01); *H04L 5/001* (2013.01); *H04L 5/0023* (2013.01)

(56) References Cited

U.S. PATENT DOCUMENTS

| | | | |
|---|---|---|---|
| 8,634,362 | B2 | 1/2014 | Montojo et al. |
| 8,804,647 | B2 | 8/2014 | Ko et al. |
| 8,923,905 | B2 | 12/2014 | Montojo et al. |
| 8,934,429 | B2 | 1/2015 | Suzuki et al. |
| 8,964,679 | B2 | 2/2015 | Anderson et al. |
| 8,983,479 | B2 | 3/2015 | Ko et al. |
| 9,055,569 | B2 | 6/2015 | Nam et al. |
| 2008/0298433 | A1 | 12/2008 | Tiirola et al. |
| 2009/0046629 | A1 | 2/2009 | Jiang et al. |
| 2009/0073944 | A1 | 3/2009 | Jiang et al. |
| 2009/0298493 | A1 | 12/2009 | Lin |
| 2009/0323957 | A1 | 12/2009 | Luo et al. |
| 2010/0062783 | A1 | 3/2010 | Luo et al. |
| 2010/0067464 | A1 | 3/2010 | Higuchi |
| 2010/0074343 | A1 | 3/2010 | Gaal et al. |
| 2010/0182903 | A1 | 7/2010 | Palanki et al. |
| 2010/0285810 | A1 | 11/2010 | Ko et al. |
| 2011/0176502 | A1 | 7/2011 | Chung et al. |
| 2011/0201334 | A1 | 8/2011 | Rosenqvist et al. |
| 2011/0256868 | A1 | 10/2011 | Nogami et al. |
| 2012/0182951 | A1 | 7/2012 | Okubo et al. |
| 2012/0250655 | A1 | 10/2012 | Noh et al. |
| 2012/0294694 | A1 | 11/2012 | Garot |
| 2012/0307868 | A1 | 12/2012 | Zhou et al. |
| 2013/0012252 | A1 | 1/2013 | Suzuki et al. |
| 2013/0121280 | A1 | 5/2013 | Ouchi et al. |
| 2013/0301439 | A1* | 11/2013 | Heo ............... H04W 76/048 370/252 |
| 2013/0301452 | A1* | 11/2013 | Yoon ............... H04W 72/0413 370/252 |
| 2013/0315195 | A1* | 11/2013 | Ko ............... H04W 72/082 370/329 |
| 2014/0204853 | A1* | 7/2014 | Ko ............... H04L 5/0073 370/329 |

FOREIGN PATENT DOCUMENTS

| | | | |
|---|---|---|---|
| WO | WO 2008/042889 | A1 | 4/2008 |
| WO | WO 2010/073468 | A1 | 7/2010 |
| WO | WO 2010/078854 | A1 | 7/2010 |
| WO | WO 2011/034357 | A2 | 3/2011 |
| WO | WO 2011/041552 | A1 | 4/2011 |
| WO | WO 2011/052353 | A1 | 5/2011 |
| WO | WO 2011/083706 | A1 | 7/2011 |

OTHER PUBLICATIONS

3GPP TSG RAN WG1 Meeting #64, R1-111000, "Discussion on further details of Scenario 4", ETRI, Agenda Item: 6.3.1.2 Further details of scenarios, pp. 1-3, Feb. 21-25, 2011.

Dahlman et al., "Uplink Physical-Layer Processing (Chapter 11)", 4G LTE/LTE—Advanced for Mobile Broadband, Mar. 21, 2011, XP055174616, pp. 203-246.

LG Electronics, "CSG Flag in Physical Cell ID," 3GPP TSG RAN WG1 #54, Aug. 18-22, 2008, pp. 1-8, R1-082911.

LG Electronics, "Uplink reference signals for CoMP," 3GPP TSG RAN WG1 Meeting #66bis, Oct. 10-14, 2011, pp. 1-5, R1-113498.

Panasonic, "Comparison of Orthogonal/Non-orthogonal CoMP transmission for PUCCH," 3GPP TSG RAN WG1 Meeting #58, Aug. 24-28, 2009, pp. 1-5, R1-093460.

Panasonic, "Uplink enhancement for Rel. 11," 3GPP TSG-RAN WG1 Meeting #66, Aug. 22-26, 2011, pp. 1-4, R1-112367.

Qualcomm Incorporated, "Further details of PUCCH format 3," 3GPP TSG-RAN WG1 #62bis, Oct. 11-15, 2010, pp. 1-17, R1-105555.

* cited by examiner

FIG. 8
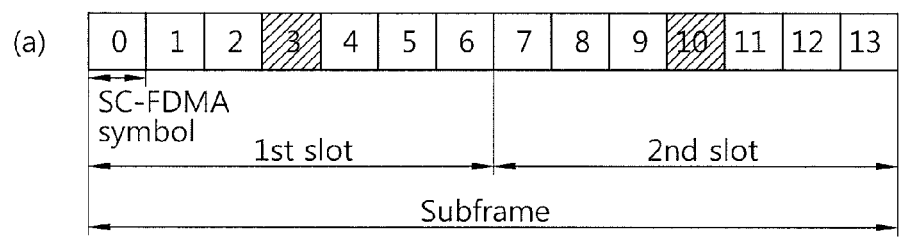
(a)
DM-RS
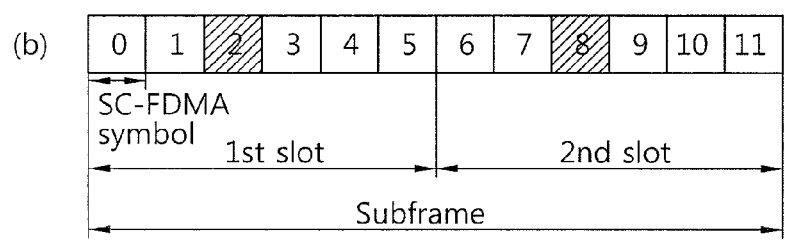
(b)
DM-RS
Freq.
→Time

METHOD FOR TRANSMITTING DEMODULATION REFERENCE SIGNALS IN WIRELESS COMMUNICATION SYSTEM AND TERMINAL USING SAME

CROSS REFERENCE TO RELATED APPLICATIONS

This application is a continuation of copending U.S. application Ser. No. 14/234,963 filed on Jan. 24, 2014, which is the National Phase of PCT/KR2012/006023 filed on Jul. 27, 2012, which claims priority under 35 U.S.C. 119(e) to U.S. Provisional Application No. 61/512,374 filed on Jul. 27, 2011. The entire contents of all these applications are hereby expressly incorporated by reference into the present application.

BACKGROUND OF THE INVENTION

The present invention relates to wireless communications, and more particularly, to an uplink reference signal transmission method for mitigating an interference in a multi-node system, and a user equipment using the method.

A data transfer amount of a wireless network has been rapidly increased in recent years. It is because various devices, e.g., a smart phone, a tablet personal computer (PC), or the like, that require machine-to-machine (M2M) communication and a high data transfer amount have been introduced and distributed. To satisfy the required high data transfer amount, a carrier aggregation technique, a cognitive radio technique, or the like for effectively using more frequency bands and a multiple antenna technique, a multiple base station cooperation technique, or the like for increasing data capacity within a limited frequency have recently drawn attention.

In addition, the wireless network has been evolved in a direction of increasing density of nodes capable of accessing to an area around a user. Herein, the node implies an antenna (or antenna group) which is separated from a distributed antenna system (DAS) by more than a certain distance. However, the node is not limited to this definition, and thus can also be used in a broader sense. That is, the node may be a pico-cell evolved node B (PeNB), a home eNB (HeNB), a remote radio head (RRH), a remote radio unit (RRU), a relay, etc. A wireless communication system having nodes with higher density can provide higher system performance through cooperation between the nodes. That is, better system performance can be achieved when one base station controller manages transmission and reception of respective nodes and thus the nodes operate as if they are antennas or an antenna group for one cell, in comparison with a case where the respective nodes operate as an independent base station (BS), advanced BS (ABS), Node-B (NB), eNode-B (eNB), access point (AP), etc., and thus do not cooperate with each other. Hereinafter, a wireless communication system including a plurality of nodes is referred to as a multi-node system.

In the multi-node system, a plurality of nodes can use one physical cell identifier (ID). Accordingly, there is an advantage in that the number of handover attempts is decreased, and cooperative communication between the nodes becomes easy.

In the conventional technique, a user equipment (UE) generates various uplink signals on the basis of a physical cell ID used by a BS or a node. However, an interference between uplink signals is increased in proportion to the number of UEs in a cell. In particular, an interference between uplink reference signals may be problematic.

SUMMARY OF THE INVENTION

The present invention provides a method for transmitting an uplink reference signal in a multi-node system, and a user equipment using the method.

According to an aspect of the present invention, a method of transmitting an uplink reference signal of a user equipment (UE) in a multi-node system is provided. The method includes: receiving a synchronization signal from a node; receiving a parameter for a virtual cell identifier (ID) from the node; generating an uplink demodulation reference signal (DM-RS) using the parameter for the virtual cell ID; and transmitting the generated uplink DM-RS to the node, wherein a physical cell ID is a cell ID obtained from the synchronization signal, and the parameter for the virtual cell ID is a parameter used for generating the uplink DM-RS in the replacement of the physical cell ID.

In the aforementioned aspect of the present invention, the parameter for the virtual cell ID may be a UE-specific parameter given differently for each UE.

In addition, the uplink DM-RS may be generated by cyclically shifting a base sequence selected from one of a plurality of sequence groups, and each of the plurality of sequence groups may include at least one base sequence.

In addition, the cyclic shift may be determined based on the parameter for the virtual cell ID.

In addition, the uplink DM-RS may be transmitted in at least two slots in a frame including a plurality of slots in a time domain, one sequence group may be selected in each slot of the at least two slots, and the uplink CM-FS may be generated by cyclically shifting one base sequence selected from the selected one sequence group.

In addition, the one sequence group selected for each slot may be determined based on the parameter for the virtual cell ID.

In addition, the base sequence selected from the one sequence group determined for each slot may be determined based on the parameter for the virtual cell ID.

In addition, the parameter for the virtual cell ID may include a virtual cell ID having any one of integer values ranges from 0 to 513, and the virtual cell ID may be used to generate the uplink DM-RS in the replacement of the physical cell ID.

In addition, the physical cell ID may be used to generate the remaining uplink signals other than the DM-RS.

In addition, the parameter for the virtual cell ID may be transmitted by using a radio resource control (RRC) message.

In addition, the method may further include receiving uplink scheduling information from the node, wherein the parameter for the virtual cell ID is generated based on a parameter included in the uplink scheduling information.

In addition, the uplink scheduling information may include information indicating a frequency band at which the UE transmits an uplink data channel, and the frequency band may include a band overlapping with a frequency band of another UE for transmitting an uplink data channel and DM-RS simultaneously with the UE.

In addition, the DM-RS may be transmitted in $4^{th}$ and $11^{th}$ single carrier-frequency division multiple access (SC-FDMA) symbols in an uplink subframe including 14 SC-FDMA symbols.

In addition, the DM-RS may be transmitted in 3rd and 9$^{th}$ SC-FDMA symbols in an uplink subframe including 12 SC-FDMA symbols.

According to another aspect of the present invention, a UE for transmitting an uplink DM-RS in a multi-node system is provided. The UE includes: a radio frequency (RF) unit for transmitting and receiving a radio signal; and a processor coupled to the RF unit, wherein the processor is configured for: receiving a synchronization signal from a node; receiving a parameter for a virtual cell ID from the node; generating an uplink DM-RS using the parameter for the virtual cell ID; and transmitting the generated uplink DM-RS to the node, wherein a physical cell ID is a cell ID obtained from the synchronization signal, and the parameter for the virtual cell ID is a parameter used for generating the uplink DM-RS in the replacement of the physical cell ID.

A user equipment (UE) can generate an uplink signal by using a physical cell identifier (ID) and a virtual cell ID additionally provided for each UE. In particular, an uplink reference signal can be generated based on the virtual cell ID. According to the present invention, an interference can be mitigated in comparison with a case where a plurality of UEs use the same physical cell ID to generate the uplink reference signal.

BRIEF DESCRIPTION OF THE DRAWINGS

FIG. 8 shows an exemplary structure of a subframe in which a reference signal is transmitted.

DETAILED DESCRIPTION OF THE INVENTION

The technology described below can be used in various multiple access schemes such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rates for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunications system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the LTE.

Figure 1:
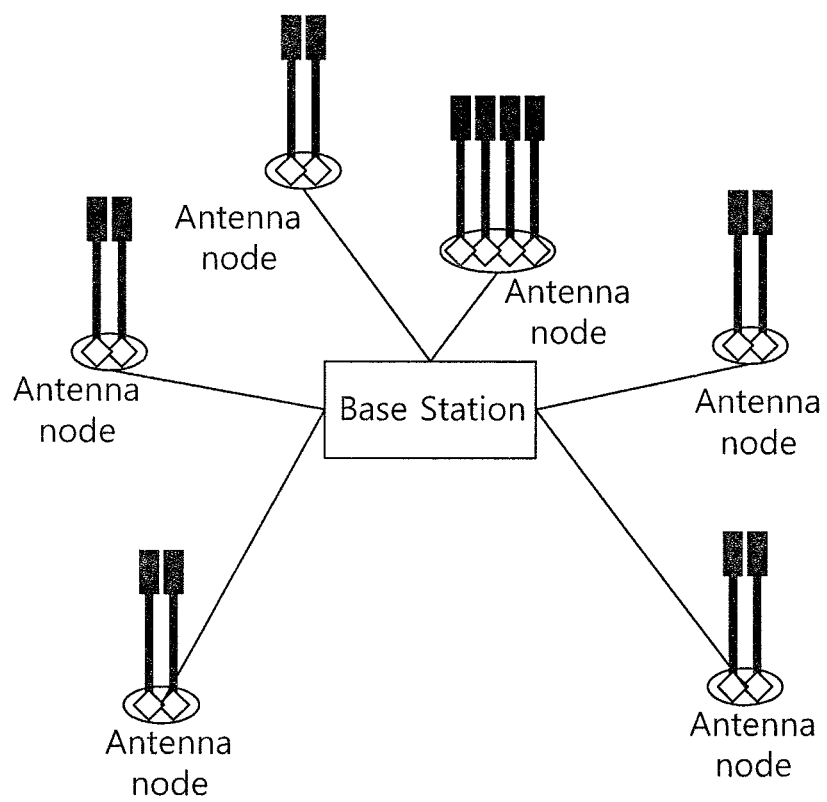
FIG. 1 shows an example of a multi-node system.

FIG. 1 shows an example of a multi-node system.

Referring to FIG. 1, the multi-node system includes a base station (BS) and a plurality of nodes.

The BS is generally a fixed station that communicates with a user equipment (UE) and may be referred to as another terminology, such as an evolved Node-B (eNB), a base transceiver system (BTS), an access point, etc. The BS coupled to the plurality of nodes can control each node.

The node may imply a macro eNB, a pico-cell eNB (PeNB), a home eNB (HeNB), a remote radio head (RRH), a relay, a distributed antenna, etc. Such a node is also referred to as a point.

In the multi-node system, if one BS controller manages transmission or reception of all nodes and thus individual nodes operate as if they are a part of one cell, then the system can be regarded as a distributed antenna system (DAS) which constitutes one cell. In the DAS, separate node identifiers (IDs) may be given to the individual nodes, or the individual nodes may operate as if they are some antenna groups within a cell without the additional node IDs. In other words, the DAS is a system in which antennas (i.e., nodes) are deployed in various positions within a cell in a distributed manner, and these antennas are managed by the BS. The DAS is different from a conventional centralized antenna system (CAS) in which antennas of the BS are concentrated in a cell center.

If the individual nodes have separate cell IDs and perform scheduling and handover in the multi-node system, the system can be regarded as a multi-cell (e.g., macro-cell/femto-cell/pico-cell) system. If the multiple cells are configured such that they overlap with each other according to coverage, this is called a multi-tier network.

Figure 2:
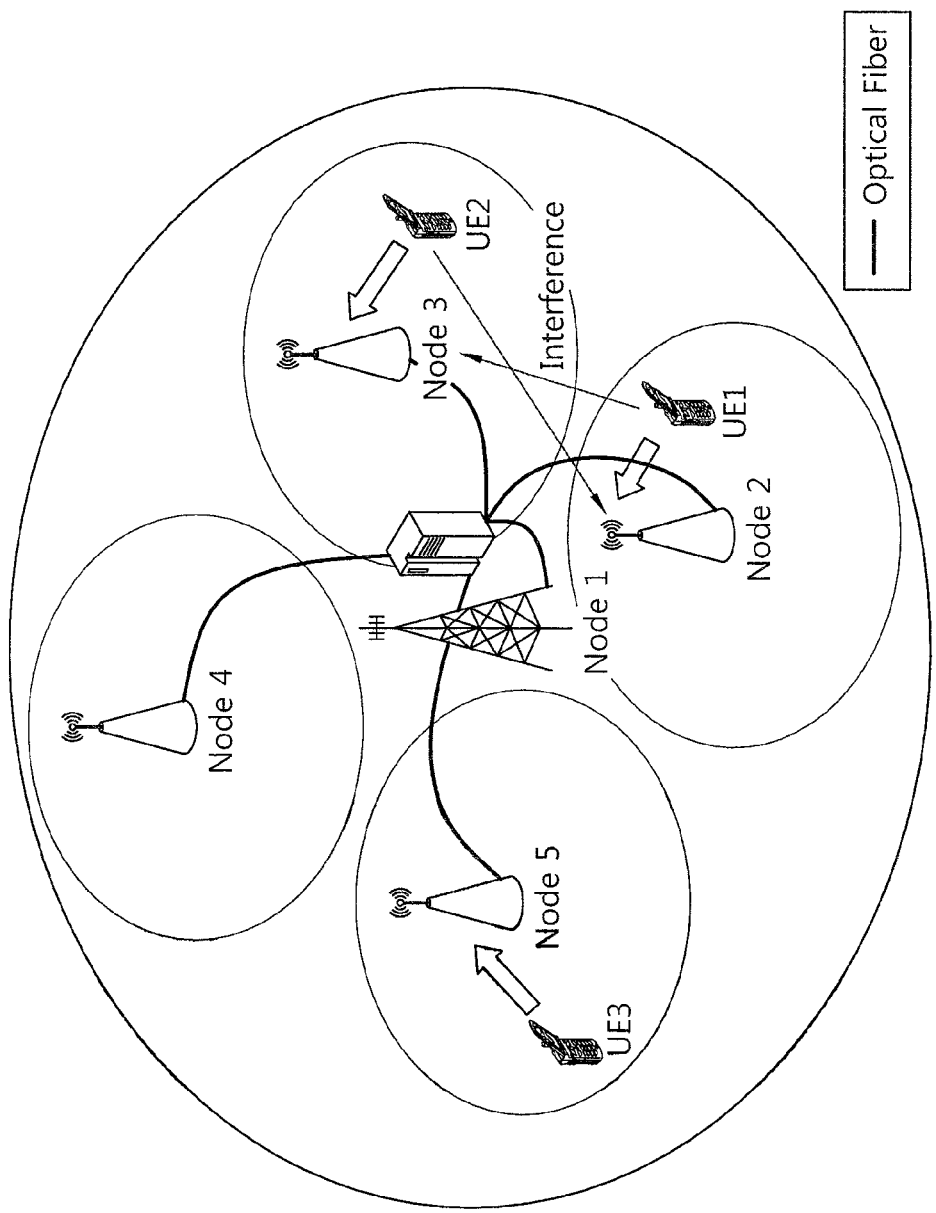
FIG. 2 shows a multi-node system using the same physical cell identifier (ID).

FIG. 2 shows a multi-node system using the same physical cell ID.

Referring to FIG. 2, a node 1 may be a macro eNB, and nodes 2 to 5 may be RRHs. The nodes 1 to 5 may use the same physical ID.

A UE may transmit an uplink signal to a different node according to a location thereof. For example, a UE 1 may transmit an uplink signal to the node 2, and a UE 2 may transmit an uplink signal to the node 3. As such, when different UEs transmit uplink signals by using the same radio resource, it may cause a mutual interference. Each UE applies uplink precoding to mitigate the mutual interference, and each node uses a reception signal processing method to mitigate the interference. This method is also called multi-user multi input multi output (MU-MIMO).

When applying the MU-MIMO method, a BS or a node uses an uplink demodulation reference signal (DM-RS) to recognize a specific precoding matrix used by the UE and a specific uplink channel experienced by the UE. The DM-RS is a reference signal related to an uplink data channel or control channel transmitted by the UE.

Therefore, when a mutual interference does not exist as much as possible between uplink DM-RSs transmitted by respective UEs, the BS or the node can correctly estimate an effective channel for each UE to remove the interference, thereby facilitating data reception.

Figure 3:
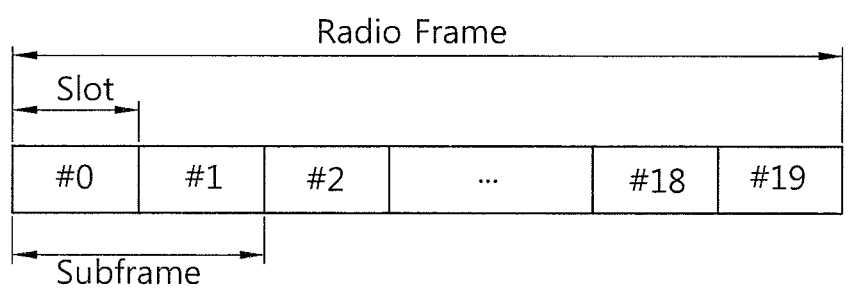
FIG. 3 shows a structure of a radio frame in 3rd generation partnership project (3GPP) long term evolution (LTE).

FIG. 3 shows a structure of a radio frame in 3GPP LTE.

Referring to FIG. 3, a radio frame includes 10 subframes. One subframe is defined as two consecutive slots. A time required for transmitting one subframe is called a transmission time interval (TTI). A time length of the radio frame is $T_f=307200*T_s=10$ ms, and consists of 20 slots. A time length of the slot is $T_{slot}=15360*T_s=0.5$ ms, and is numbered from 0 to 19. In frequency division duplex (FDD), a downlink in which each node or BS transmits a signal to a UE and an uplink in which the UE transmits a signal to each node or BS are divided in a frequency domain. In time division duplex (TDD), a downlink and an uplink can use the same frequency band between each node (or BS) and the UE, and can be divided in a time domain.

Figure 4:
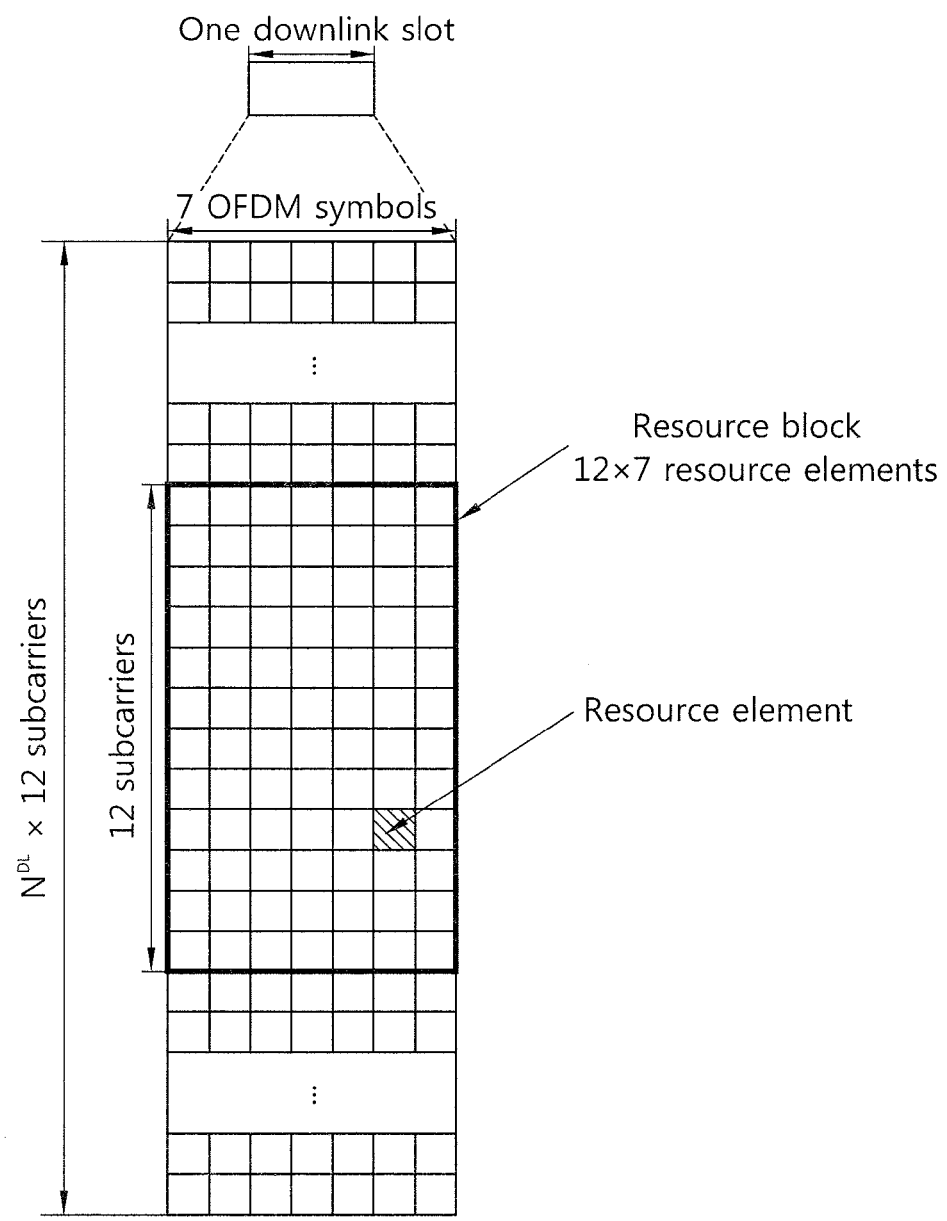
FIG. 4 shows an example of a resource grid for one slot.

FIG. 4 shows an example of a resource grid for one slot.

Referring to FIG. 4, one slot includes a plurality of orthogonal frequency-division multiplexing (OFDM) symbols in a time domain, and includes $N_{RB}$ resource blocks in a frequency domain. Herein, one slot includes 7 OFDMA symbols, and one resource block (RB) includes 12 subcarriers in the frequency domain. However, this is for exemplary purposes only, and thus the present invention is not limited thereto.

Each element on the resource grid is referred to as a resource element (RE). The RE on the resource grid can be identified by an index pair (k,l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

The number $N^{DL}$ of RBs included in a downlink slot depends on a downlink transmission bandwidth determined in a cell.

Figure 5:
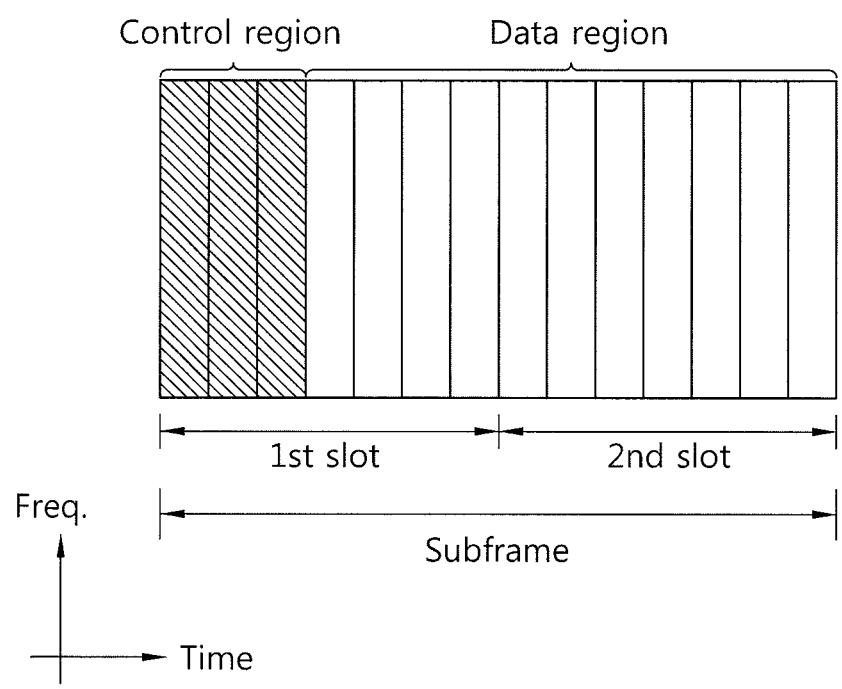
FIG. 5 shows a structure of a downlink subframe.

FIG. 5 shows a structure of a downlink subframe.

Referring to FIG. 5, the downlink subframe is divided into a control region and a data region in a time domain. The control region includes up to first four OFDM symbols of a $1^{st}$ slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, 3GPP LTE/LTE-A classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the downlink subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of a possible PDCCH are determined.

One REG includes 4 REs. one CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a UE having a good downlink channel state can use one CCE in PDCCH transmission. A UE having a poor downlink channel state can use 8 CCEs in PDCCH transmission.

A control channel consisting of one or more CCEs performs interleaving in an REG unit, and is mapped to a physical resource after performing cyclic shift based on a cell identifier (ID).

Figure 6:
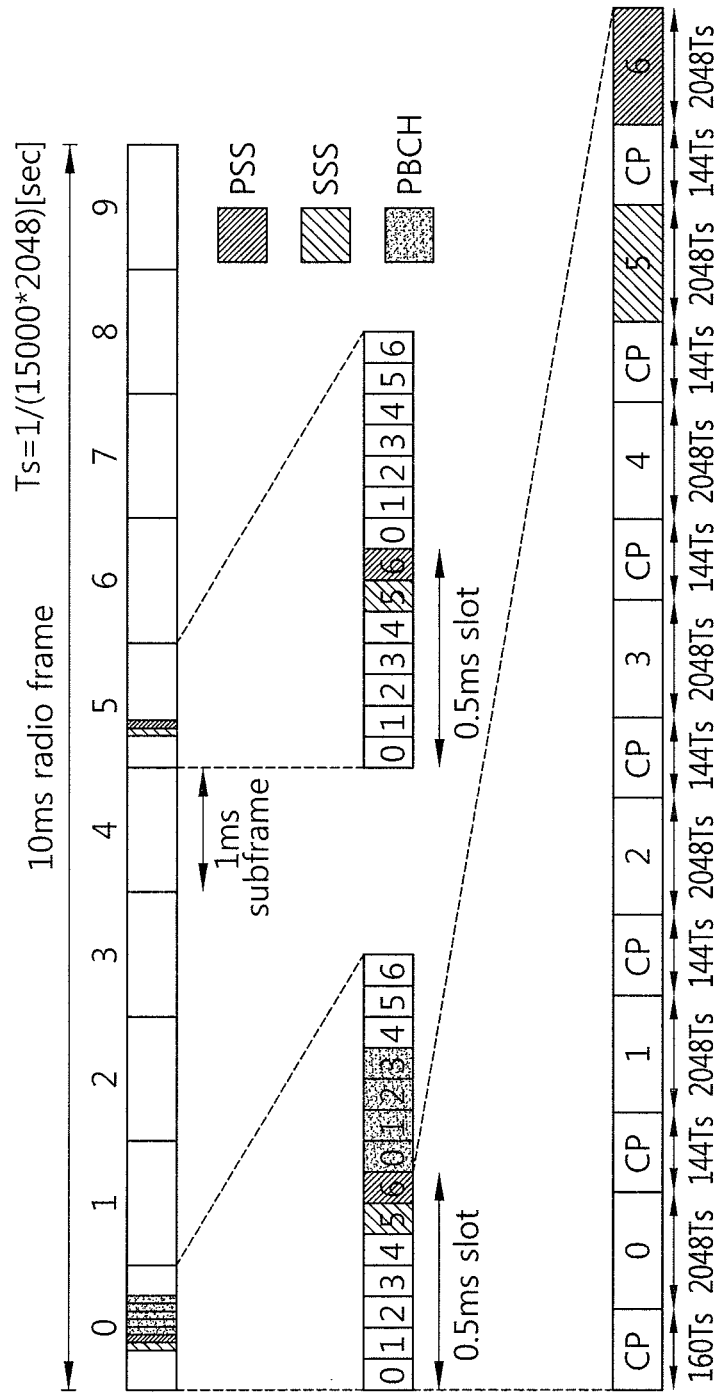
FIG. 6 shows an orthogonal frequency-division multiplexing (OFDM) symbol for transmitting a synchronization signal and a physical broadcast channel (PBCH) within a radio frame in a frequency division duplex (FDD) system.

FIG. 6 shows an OFDM symbol for transmitting a synchronization signal and a PBCH within a radio frame in a frequency division duplex (FDD) system.

Referring to FIG. 6, a primary synchronization signal (PSS) is transmitted through last OFDM symbols of a slot #0 and a slot #10 within a frame. The same PSS is transmitted using 2 OFDM symbols. The PSS is used to obtain time domain synchronization such as OFDM symbol synchronization, slot synchronization, or the like and/or frequency domain synchronization. A Zadoff-Chu (ZC) sequence can be used as the PSS. At least one PSS exists in a wireless communication system.

A secondary synchronization signal (SSS) is transmitted through an immediately previous OFDM symbol from the last OFDM symbols of the slot #0 and the slot #10 within the frame. That is, the SSS and the PSS can be transmitted through contiguous OFDM symbols. In addition, different SSSs are transmitted through two OFDM symbols being transmitted. The SSS is used to obtain frame synchronization and/or cyclic prefix (CP) configuration of a cell, i.e., usage information of a normal CP or an extended CP. An m-sequence may be used as the SSS. One OFDM symbol includes two m-sequences. For example, if one OFDM symbol includes 63 subcarriers, two m-sequences each having a length of 31 are mapped to one OFDM symbol.

If a physical cell ID is denoted by $N^{cell}_{ID}$, then $N^{cell}_{ID}$ can be obtained by Equation 1 below $$N^{cell}_{ID}=3N^{(1)}_{ID}+N^{(2)}_{ID} \quad\quad\quad \text{[Equation 1]}$$

Herein, $N^{(2)}_{ID}$ denotes a physical layer ID as one of values ranges from 0 to 2, and is obtained by using the PSS. $N^{(1)}_{ID}$ denotes a cell group ID as one of values ranges from 0 to 167, and is obtained by using the SSS.

A physical broadcast channel (PBCH) is located at a subframe 0 (i.e., a $1^{st}$ subframe) of a radio frame in a time domain. For example, the PBCH can be transmitted in a $2^{nd}$ slot of the subframe 0, i.e., first four OFDM symbols (i.e., from an OFDM symbol 0 to an OFDM symbol 3) of a slot 1. The PBCH can be transmitted by using the 72 consecutive subcarriers in a frequency domain. The PBCH carries a limited number of parameters which are most frequently transmitted and are essential for initial cell access. A master information block (MIB) includes these essential parameters. In the PBCH, each MIB transmission is spread with a period of 40 ms. That is, transmission is performed in four consecutive frames. This is to avoid missing of one entire MIB.

Figure 7:
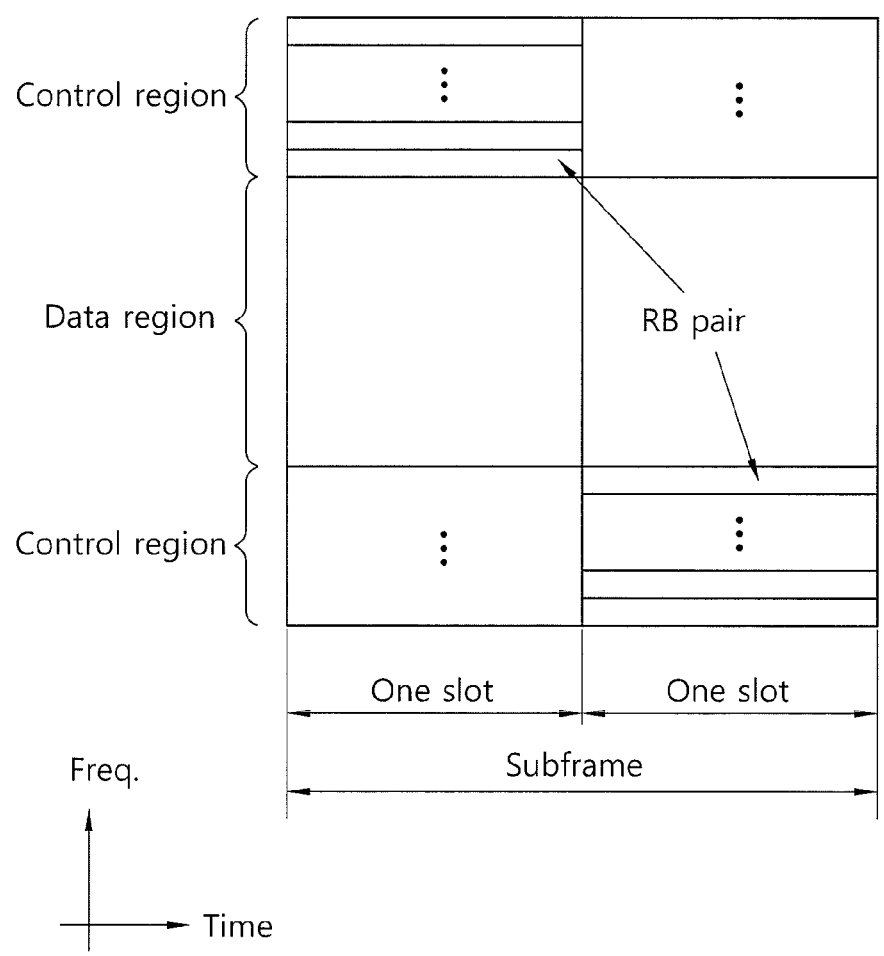
FIG. 7 shows a structure of an uplink subframe.

FIG. 7 shows a structure of an uplink subframe.

Referring to FIG. 7, the uplink subframe can be divided into a control region and a data region. A physical uplink control channel (PUCCH) for carrying uplink control information (UCI) is allocated to the control region. A physical uplink shared channel (PUSCH) for carrying UL data and/or the UCI is allocated to the data region. In this sense, the control region can be called a PUCCH region, and the data region can be called a PUSCH region. According to configuration information indicated by a higher layer, a UE may support simultaneous transmission of the PUSCH and the PUCCH or may not support simultaneous transmission of the PUSCH and the PUCCH.

The PUSCH is mapped to an uplink shared channel (UL-SCH) which is a transport channel. UL data transmitted on the PUSCH may be a transport block which is a data block for the UL-SCH transmitted during TTI. The transport block may be user information. Alternatively, the uplink data may be multiplexed data. The multiplexed data may be attained by multiplexing control information and the transport block for the UL-SCH. Examples of the UCI to be multiplexed to the uplink data include a channel quality indicator (CQI), a precoding matrix indicator (PMI), a hybrid automatic repeat request (HARQ) acknowledgement/not-acknowledgement (ACK/NACK), a rank indicator (RI), a precoding type indication (PTI), etc. As such, when the UCI is transmitted in the data region together with the uplink data, it is called piggyback transmission of the UCI. Only the UCI may be transmitted through the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at the slot boundary. Since the UE transmits UCI on a time basis through different subcarriers, a frequency diversity gain can be obtained.

The UE generates a PUSCH signal through a process of scrambling, modulation, mapping to a transport layer, precoding, mapping to a resource element, generating of an SC-FDMA signal. In this case, a sequence used in the scrambling is generated based on a UE-specific ID (i.e., an RNTI for the UE), and a physical cell ID.

Hereinafter, an uplink reference signal (RS) will be described.

In general, an RS is transmitted as a sequence. Any sequence can be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Example of the PN sequence include an m-sequence, a computer generated sequence, a gold sequence, a Kasami sequence, etc. In addition, the RS sequence may be a cyclically-shifted sequence.

The uplink RS can be classified into a demodulation reference signal (DM-RS) and a sounding reference signal (SRS). The DM-RS is an RS used for channel estimation to demodulate a received signal. The DM-RS can be combined with PUSCH or PUCCH transmission. The SRS is an RS transmitted for uplink scheduling by a UE to a BS. The BS estimates an uplink channel by using the received SRS, and the estimated uplink channel is used in uplink scheduling. The SRS is not combined with PUSCH or PUCCH transmission. The same type of base sequences can be used for the DM-RS and the SRS. Meanwhile, precoding applied to the DM-RS in uplink multi-antenna transmission may be the same as precoding applied to the PUSCH. Cyclic shift separation is a primary scheme for multiplexing the DM-RS. In a 3GPP LTE-A system, the SRS may not be precoded, and may be an antenna-specific RS.

An RS sequence $r_{u,v}^{(\alpha)}(n)$ can be defined based on a base sequence $b_{u,v}(n)$ and a cyclic shift $\alpha$ according to Equation 2.

$$r_{u,v}^{(\alpha)}(n)=e^{j\alpha n}b_{u,v}(n), 0 \leq n < M_{sc}^{RS} \quad \text{[Equation 2]}$$

In Equation 2, $M_{sc}^{RS}$ ($1 \leq m \leq N_{RB}^{max,UL}$) denotes an RS sequence length, where $M_{sc}^{RS}=m*N_{sc}^{RB}$. $N_{sc}^{RB}$ denotes a size of a resource block represented by the number of subcarriers in a frequency domain. $N_{RB}^{max,UL}$ denotes a maximum value of an uplink bandwidth expressed by a multiple of $N_{sc}^{RB}$. A plurality of RS sequences can be defined by differently applying a cyclic shift value $\alpha$ from one base sequence.

The base sequence is divided into a plurality of groups. In this case, $u \in \{0, 1, \ldots, 29\}$ denotes a group index, and v denotes a base sequence index in a group. The base sequence depends on a base sequence length $M_{sc}^{RS}$. Each group includes one base sequence (i.e., v=0) having a length of $M_{sc}^{RS}$ with respect to m (where $1 \leq m \leq 5$), and includes two base sequences (i.e., v=0, 1) having a length of $M_{sc}^{RS}$ with respect to m (where $6 \leq m \leq n_{RB}^{max,UL}$). The sequence group index u and the base sequence index v may vary over time similarly to group hopping or sequence hopping to be described below.

In addition, if the RS sequence has a length greater than or equal to $3N_{sc}^{RB}$, the base sequence can be defined by Equation 3.

$$b_{u,v}(n)=x_q(n \bmod N_{ZC}^{RC}), 0 \leq n < M_{sc}^{RS} \quad \text{[Equation 3]}$$

In Equation 3, q denotes a root index of a Zadoff-Chu (ZC) sequence. $N_{ZC}^{RS}$ denotes a length of the ZC sequence, and may be given to a maximum prime number less than $M_{sc}^{RS}$. The ZC sequence with the root index q can be defined by Equation 4.

$$x_q(m) = e^{-j\frac{\pi q m(m+1)}{N_{ZC}^{RS}}}, 0 \leq m \leq N_{ZC}^{RS} - 1 \quad \text{[Equation 4]}$$

q can be given by Equation 5.

$$q = \lfloor \bar{q} + 1/2 \rfloor + v \cdot (-1)^{\lfloor 2\bar{q} \rfloor}$$
$$\bar{q} = N_{ZC}^{RS} \cdot (u+1)/31 \quad \text{[Equation 5]}$$

If the length of the RS sequence is less than or equal to $3N_{sc}^{RB}$, the base sequence can be defined by Equation 6.

$$b_{u,v}(n) = e^{j\phi(n)\pi/4}, 0 \leq n \leq M_{sc}^{RS} - 1 \quad \text{[Equation 6]}$$

Table 1 shows an example of defining φ(n) when MscRS=NscRB.

TABLE 1

| u | φ(0), . . . , φ(11) |
|---|---|
| 0 | −1  1  3 −3  3  3  1  1  3  1 −3  3 |
| 1 |  1  1  3  3  3 −1  1 −3 −3  1 −3  3 |
| 2 |  1  1 −3 −3 −3 −1 −3 −3  1 −3  1 −1 |
| 3 | −1  1  1  1  1 −1 −3 −3  1 −3  3 −1 |
| 4 | −1  3  1 −1  1 −1 −3 −1  1 −1  1  3 |
| 5 |  1 −3  3 −1 −1  1  1 −1 −1  3 −3  1 |
| 6 | −1  3 −3 −3 −3  3  1 −1  3  3 −3  1 |
| 7 | −3 −1 −1 −1  1 −3  3 −1  1 −3  3  1 |
| 8 |  1 −3  3  1 −1 −1 −1  1  1  3 −1  1 |
| 9 |  1 −3 −1  3  3 −1 −3  1  1  1  1  1 |
| 10 | −1  3 −1  1  1 −3 −3 −1 −3 −3  3 −1 |
| 11 |  3  1 −1 −1  3  3 −3  1  3  1  3  3 |
| 12 |  1 −3  1  1 −3  1  1  1 −3 −3 −3  1 |
| 13 |  3  3 −3  3 −3  1  1  3 −1 −3  3  3 |
| 14 | −3  1 −1 −3 −1  3  1  3  3  3 −1  1 |
| 15 |  3 −1  1 −3 −1 −1  1  1  3  1 −1 −3 |
| 16 |  1  3  1 −1  1  3  3  3 −1 −1  3 −1 |
| 17 | −3  1  1  3 −3  3 −3 −3  3  1  3 −1 |
| 18 | −3  3  1  3  1 −3 −3 −1  1 −3 −1 −3 |
| 19 | −1  3  1  3  1 −1 −1  3 −3 −1 −3 −3 |
| 20 | −1 −3  1  1  1  1  3  1 −1  1 −3 −3 |
| 21 | −1  3 −1  1 −3 −3 −3 −3 −3  1 −1 −3 |
| 22 |  1  1 −3 −3 −3 −3 −1  3 −3  1 −3  3 |
| 23 |  1  1 −1 −3 −1 −3  1 −1  1  3 −1  1 |
| 24 |  1  1  3  1  3  3 −1  1 −1 −3 −3  1 |
| 25 |  1 −3  3  3  1  3  3  1 −3 −1 −1  3 |

TABLE 1-continued

| u | φ(0), . . . , φ(11) |
|---|---|
| 26 |  1  3 −3 −3  3 −3  1 −1 −1  3 −1 −3 |
| 27 | −3 −1 −3 −1 −3  3  1 −1  1  3 −3 −3 |
| 28 | −1  3 −3  3 −1  3  3 −3  3  3 −1 −1 |
| 29 |  3 −3 −3 −1 −1 −3 −1  3 −3  3  1 −1 |

Table 2 shows an example of defining φ(n) when $M_{sc}^{RS} = 2 \cdot N_{sc}^{RB}$.

TABLE 2

| u | φ(0), . . . , φ(23) |
|---|---|
| 0 | −1  3  1 −3  3 −1  1  3 −3  3  1  3 −3  3  1  1 −1  1  3 −3  3 −3 −1 −3 |
| 1 | −3  3 −3 −3 −3  1 −3 −3  3 −1  1  1  1  3  1 −1  3 −3 −3  1  3  1  1 −3 |
| 2 |  3 −1  3  3  1  1 −3  3  3  3  3  1 −1  3 −1  1  1 −1 −3 −1 −1  1  3  3 |
| 3 | −1 −3  1  1  3 −3  1  1 −3 −1 −1  1  3  1  3  1 −1  3  1  1 −3 −1 −3 −1 |
| 4 | −1 −1 −1 −3 −3 −1  1  1  3  3 −1  3 −1  1 −1 −3  1 −1 −3 −3  1 −3 −1 −1 |
| 5 | −3  1  1  3 −1  1  3  1 −3  1 −3  1  1 −1 −1  3 −1 −3  3 −3 −3 −3  1  1 |
| 6 |  1  1 −1 −1  3 −3 −3  3 −3  1 −1 −1  1 −1  1  1 −1 −3 −1  1 −1  3 −1 −3 |
| 7 | −3  3  3 −1 −1 −3 −1  3  1  3  1  3  1  1 −1  3  1 −1  1  3 −3 −1 −1  1 |
| 8 | −3  1  3 −3  1 −1 −3  3 −3  3 −1 −1 −1 −1  1 −3 −3 −3  1 −3 −3 −3  1 −3 |
| 9 |  1  1 −3  3  3 −1 −3 −1  3 −3  3  3  3 −1  1  1 −3  1 −1  1  1 −3  1  1 |
| 10 | −1  1 −3 −3  3 −1  3 −1 −1 −3 −3 −3 −1 −3 −3  1 −1  1  3  3 −1  1 −1  3 |
| 11 |  1  3  3 −3 −3  1  3  1 −1 −3 −3  3  3  3 −3  3 −3 −1 −3  3 −1 −1 −3  1 |
| 12 |  1  3  3  1  1  1 −1 −1  1 −3  3 −1  1  1 −3  3  3 −1 −3  3 −3 −1 −3 −1 |
| 13 |  3 −1 −1 −1 −1 −3 −1  3  3  1 −1  1  3  3 −1  1  1 −3  1  3 −1 −3  3  3 |
| 14 | −3 −3  3  1  3  1 −3  3  1  3  1  1  3  3 −1 −1  3  1 −3  1  3  1  1  3 |
| 15 | −1 −1  1 −3  1  3 −3  1 −1 −3 −1  3  1  3  1 −1 −3 −3 −1 −1 −3 −3 −3 −1 |
| 16 | −1 −3  3 −1 −1 −1 −1  1  1 −3  3  1  3  3  1 −1  1 −3  1 −3  1  1 −3 −1 |
| 17 |  1  3 −1  3  3 −1 −3  1 −1  3  3  3 −1  1  1  3 −1 −3 −1  3 −1 −1 −1  1 |
| 18 |  1  1  1  1  1 −1  3 −1 −3  1  1  3 −3  1 −3 −1  1  1 −3 −3  3  1  1 −3 |
| 19 |  1  3  3  1 −1 −3  3 −1  3  3  3 −3  1 −1  1 −1 −3 −1  1  3 −1  3 −3 −3 |
| 20 | −1 −3  3 −3 −3 −3 −1 −1 −3 −1 −3  3  1  3 −3 −1  3 −1  1 −1  3 −3  1 −1 |
| 21 | −3 −3  1  1 −1  1 −1  1 −1  3  1 −3 −1  1 −1  1 −1 −1  3  3 −3 −1  1 −3 |
| 22 | −3 −1 −3  3  1 −1 −3 −3 −3 −3 −3  3  1 −1  3 −1  3 −1  1  3  1 −3 −1 −3 |
| 23 | −3 −1 −1 −1  3  3  3  1  3  3 −3  1  3 −1  3  3 −3  3 −1  1  3  3 −3 −3 |
| 24 |  1 −1  3  3 −1 −3  3 −3 −1 −1  3 −1  3 −1 −1  1  1  1  1 −1 −1 −3 −1  3 |
| 25 |  1 −1  1 −1  3 −1  3  1  1 −1 −1 −3  1  1 −3  1  3 −3  1  1 −3 −3 −1 −1 |
| 26 | −3 −1  1  3  1  1 −3 −1 −1 −3  3 −3  3  1 −3  3 −3  1 −1  1 −3  1  1  1 |
| 27 | −1 −3  3  3  1  1  3 −1 −3 −1 −1 −1  3  1 −3 −3 −1  3 −3 −1 −3 −1 −3 −1 |
| 28 | −1 −3 −1 −1  1 −3 −1 −1  1 −1 −3  1  1 −3  1 −3 −3  3  1  1 −1  3 −1 −1 |
| 29 |  1  1 −1 −1 −3 −1  3 −1  3 −1  1  3  1 −1  3  1  3 −3 −3  1 −1 −1  1  3 |

Hopping of the RS can be applied as follows.

A sequence group index u for each slot index $n_s$ can be defined based on a group hopping pattern $f_{gh}(n_s)$ and a sequence shift pattern $f_{ss}$ according to Equation 7.

$$u = (f_{gh}(n_s) + f_{ss}) \mod 30 \quad \text{[Equation 7]}$$

There may be 17 different group hopping patterns and 30 different sequence shift patterns. Whether to apply group hopping may be indicated by a higher layer.

The PUCCH and the PUSCH may have the same group hopping pattern. The group hopping pattern $f_{gh}(n_s)$ can be defined by Equation 8.

$$f_{gh}(n_s) = \begin{cases} 0 & \text{if group hopping is disabled} \\ \left( \sum_{i=0}^{7} c(8n_s + i) \cdot 2^i \right) \mod 30 & \text{if group hopping is enabled} \end{cases} \quad \text{[Equation 8]}$$

In Equation 8, c(i) is a PN sequence, i.e., a pseudo-random sequence. The PN sequence can be defined by a length-31 gold sequence. Equation 9 shows an example of the gold sequence c(n).

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_1(n+1)+x_1(n)) \bmod 2 \quad \text{[Equation 9]}$$

Herein, Nc is 1600, x(i) is a first m-sequence, and y(i) is a second m-sequence. For example, the first m-sequence or the second m-sequence may be initialized in each OFDM symbol according to a cell ID, a slot number in a radio frame, an OFDM symbol index in a slot, a CP type, etc. A pseudo-random sequence generator can be initialized as $$c_{init} = \left\lfloor \frac{N_{ID}^{cell}}{30} \right\rfloor$$

at the start of each radio frame.

c(i) can be expressed by the example of Equation 9. Whether to apply the sequence hopping can be indicated by a higher layer. A pseudo-random sequence generator can be initialized as $$c_{init} = \left\lfloor \frac{N_{ID}^{cell}}{30} \right\rfloor \cdot 2^5 + f_{ss}^{PUSCH}$$

at the start of each radio frame.

A DM-RS sequence for the PUSCH can be defined by Equation 11.

$$r_{PUSCH}^{(\lambda)}(m \cdot M_{sc}^{RS}+n)=w^{(\lambda)}(m)r_{u,v}^{(\alpha_\lambda)}(n) \quad \text{[Equation 11]}$$

In Equation 11, λ denotes a layer, and is any one of $\{0, 1, \ldots, v-1\}$. In addition, m=0, 1, and n=0, ..., $M_{sc}^{RS}-1$. $M_{sc}^{RS}=M_{sc}^{PUSCH}$, and a sequence $r_{u,v}^{(\alpha_\lambda)}(0), \ldots, r_{u,v}^{(\alpha_\lambda)}(M_{sc}^{RS}-1)$ is defined by Equation 2.

An orthogonal sequence $w^{(\lambda)}(m)$ is given by $[w^{(\lambda)}(0) \ w^{(\lambda)}(1)]=[1 \ 1]$ for a DCI format 0 if a higher layer parameter (i.e., Activate-DMRS-with OCC) is not configured or if a temporary C-RNTI is used to transmit the latest uplink-related DCI for a transport block associated with corresponding PUSCH transmission, and otherwise it is given by a cyclic shift field included in the latest uplink-related DCI for the transport block associated with the corresponding PUSCH transmission as shown in the following table.

TABLE 3

| Cyclic Shift Field in uplink-related DCI format | $n_{DMRS,\lambda}^{(2)}$ | | | | $[w^{(\lambda)}(0) \ w^{(\lambda)}(1)]$ | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

The PUCCH and the PUSCH may have the same sequence shift pattern. The sequence shift pattern of the PUCCH can be given as $f_{ss}^{PUCCH}=N_{ID}^{cell} \bmod 30$. The sequence shift pattern of the PUSCH can be given as $f_{ss}^{PUSCH}=(f_{ss}^{PUCCH}+\Delta_{ss}) \bmod 30$, and $\Delta_{ss} \in \{0, 1, \ldots, 29\}$ can be configured by a higher layer.

Sequence hopping can be applied only to an RS sequence having a length greater than $6N_{sc}^{RB}$. In case of an RS having a length less than $6N_{sc}^{RB}$, a base sequence index v in a base sequence group is given to 0. In case of an RS having a length greater than or equal to $6N_{sc}^{RB}$, a base sequence index v in a base sequence group of a slot index $n_s$ can be defined by Equation 10.

$$v = \begin{cases} c(n_s) & \text{if group hopping is disabled and sequence hopping is enabled} \\ 0 & \text{otherwise} \end{cases} \quad \text{[Equation 10]}$$

In the slot $n_s$, a cyclic shift value is given as $\alpha_\lambda=2\pi n_{cs,\lambda}/12$, and $n_{cs,\lambda}$ can be defined by Equation 12.

$$n_{cs,\lambda}=(n_{DMRS}^{(1)}+n_{DMRS,\lambda}^{(2)}+n_{PN}(n_s)) \bmod 12 \quad \text{[Equation 12]}$$

In Equation 12, $n^{(2)}_{DMRS,\lambda}$ denotes a value given in Table 3 above according to a cyclic shift field for a DMRS included in the latest uplink-related DCI for the transport block associated with the corresponding PUSCH transmission, and $n^{(1)}_{DMRS}$ denotes a value given in Table 4 below according to a parameter 'cyclicShift' provided by a higher layer signal.

TABLE 4

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

$n_{PN}(n_s)$ is given by the following equation.

$$n_{PN}(n_s)=\Sigma_{i=0}^{7}c(8N_{symb}^{UL} \cdot n_s+i) \cdot 2^i \quad \text{[Equation 13]}$$

In Equation 13, a pseudo-random sequence c(i) is defined by Equation 9. A pseudo-random sequence generator can be initialized as $$c_{init} = \left\lfloor \frac{N_{ID}^{cell}}{30} \right\rfloor \cdot 2^5 + f_{ss}^{PUSCH}$$

at the start of each radio frame.

A vector of RSs can be precoded by the following equation.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(v-1)} \end{bmatrix}$$ [Equation 14]

In Equation 14, P denotes the number of antenna ports used for PUSCH transmission. For PUSCH transmission using a single-antenna port, P=1, W=1, and v=1.

For spatial multiplexing, P=2 or P=4. A precoding matrix W may be identical to a precoding matrix used for the PUSCH in the same subframe.

As described above with reference to Equations 2 to 14, the existing DM-RS is generated based on a physical cell ID in a process of base sequence generation, and group hopping and sequence hopping.

The DM-RS generated through the aforementioned process is transmitted after being mapped to a physical resource.

FIG. 8 shows an exemplary structure of a subframe in which an RS is transmitted.

The subframe structure of FIG. 8-(*a*) is for a normal CP case. The subframe includes a 1$^{st}$ slot and a 2$^{nd}$ slot. Each of the 1$^{st}$ slot and the 2$^{nd}$ slot includes 7 SC-FDMA symbols. 14 SC-FDMA symbols in the subframe are indexed from 0 to 13. The RS can be transmitted by using SC-FDMA symbols indexed from 3 to 10. The RS can be transmitted by using a sequence. A ZC sequence can be used as an RS sequence. Various ZC sequences can be generated according to a root index and a cyclic shift value. A BS can estimate a channel of a plurality of UEs through an orthogonal sequence or a quasi-orthogonal sequence by allocating a different cyclic shift value to the UE. A location of a frequency domain occupied by the RS may be identical or different in two slots in the subframe. The same RS sequence is used in the two slots. Data can be transmitted through the remaining SC-FDMA symbols other than an SC-FDMA symbol in which the RS is transmitted. The subframe structure of FIG. 8-(*b*) is for an extended CP case. The subframe includes a 1$^{st}$ slot and a 2$^{nd}$ slot. Each of the 1$^{st}$ slot and the 2$^{nd}$ slot includes 6 SC-FDMA symbols. 12 SC-FDMA symbols in the subframe are indexed from 0 to 11. The RS is transmitted through SC-FDMA symbols indexed from 2 to 8. Data is transmitted through the remaining SC-FDMA symbols other than an SC-FDMA symbol in which the RS is transmitted.

In MU-MIMO transmission, the same frequency band is allocated to multiple UEs by using a PUSCH resource when using the conventional method. In addition, when generating a DM-RS sequence, each UE applies a different cyclic shift value α and orthogonal code cover (OCC) value. According to this method, the most orthogonal DM-RS sequences are transmitted between the UEs. However, there are many UEs in a multi-node system, and each UE may have different uplink channel quality and a different uplink signal transmission amount. Therefore, it may be required to allocate a PUSCH resource having a different number of resource blocks to each UE.

For this, PUSCH resources each having a different number of resource blocks can be allocated to respective UEs, and there may be an overlapping (duplicated) region between the allocated PUSCH resources. That is, scheduling can be achieved such that MU-MIMO transmission is performed only in some of the PUSCH regions allocated to the respective UEs. In this case, if the UEs to which the overlapping PUSCH resources are allocated generate a DM-RS according to the conventional method, orthogonality is significantly impaired between sequences constituting the DM-RS.

Figure 9:
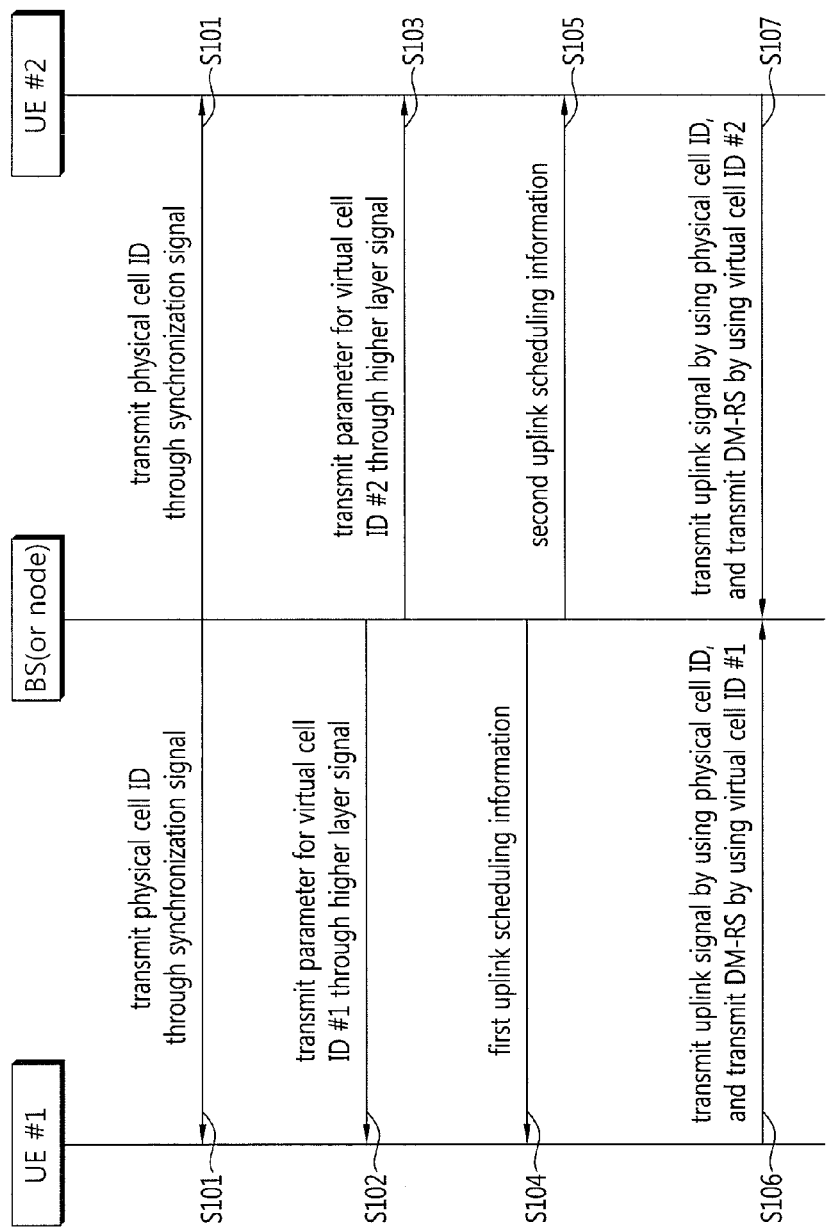
FIG. 9 shows a demodulation reference signal (DM-RS) transmission method according to an embodiment of the present invention.

FIG. 9 shows a DM-RS transmission method according to an embodiment of the present invention. It is assumed that UEs #1 and #2 are UEs which operate based on MU-MIMO.

Referring to FIG. 9, a BS or a node transmits a physical ID to the UEs #1 and #2 by using a synchronization signal (step S101).

The BS or the node transmits a parameter for a virtual cell ID #1 to the UE #1 by using a higher layer signal (step S102). In addition, the BS or the node transmits a parameter for a virtual cell ID #2 by using a higher layer signal (step S103). Herein, the virtual cell ID is a cell ID which is virtual and which is provided for each UE, and differs from the physical cell ID. The virtual cell ID may be used when the UE generates a DM-RS.

The parameter for the virtual cell ID may be plural in number, and for example, may be $N^{(1)}_{ID}$ and $N^{(2)}_{ID}$ used to generate the physical cell ID.

Although an example of transmitting the parameter for the virtual cell ID by using the higher layer signal such as a radio resource control (RRC) message is described in FIG. 9, the present invention is not limited thereto. That is, the parameter for the virtual cell ID may be transmitted by being included in physical layer control information, i.e., DCI.

The BS or the node transmits first uplink scheduling information to the UE #1 (step S104). The BS or the node transmits second uplink scheduling information to the UE #2 (step S105). Herein, by using the first uplink scheduling information and the second uplink scheduling information, PUSCHs each having a different number of resource blocks may be scheduled for the UEs #1 and #2 in such a manner that some of the resource blocks overlap with each other.

The UE #1 transmits an uplink signal by using the physical cell ID, and transmits the DM-RS by using the virtual cell ID #1 (step S106). For example, the uplink signal which uses the physical cell ID may be an SRS. The UE #2 transmits the uplink signal by using the physical cell ID, and transmits the DM-RS by using the virtual cell ID #2 (step S107).

That is, each UE may generate and transmit some uplink signals by using the same physical cell ID, and may generate and transmit the DM-RS by using different virtual cell IDs. That is, to generate the DM-RS, the UE uses the virtual cell ID instead of a physical cell ID $N^{cell}_{ID}$ in some or all of the aforementioned Equations 2 to 13. In other words, UEs existing in the same cell generate a DM-RS sequence by using different virtual cell IDs. In this case, the number of resource blocks allocated to the PUSCHs may differ between the UEs #1 and #2, and the DM-RS may be transmitted only in an allocated PUSCH region. Therefore, orthogonality is not completely maintained between the DM-RS sequences. However, this method provides a better performance than a case where a DM-RS sequence generated by using the same physical cell ID is distinguished by using a cyclic shift or an OCC and is then transmitted by UEs to which the different numbers of resource blocks are allocated. A process of generating a DM-RS by each UE by using a parameter for a virtual cell ID will be described in greater detail.

The virtual cell ID can replace a physical cell ID in a part or entirety of the sequence generation, group hopping and sequence hopping process of the DM-RS described in Equations 2 to 13. As described above, a sequence used as the DM-RS is generated by cyclically shifting a base sequence selected from one sequence group among a plurality of sequence groups. Each of the plurality of sequence groups includes one base sequence.

In addition, the DM-RS is transmitted in at least two slots in a frame including a plurality of slots in a time domain. In this case, one sequence group is selected for each slot of the slots in which the DM-RS is transmitted. This process is called group hopping. In addition, one base sequence is selected from the selected one sequence group, and this process is called sequence hopping.

If each of the aforementioned three processes has a different value for replacing the existing physical cell ID, a plurality of parameters can be configured for the parameter for the virtual cell ID.

For example, if a cell ID to be used when the base sequence of the DM-RS is generated differs from a cell ID to be used in DM-RS sequence hopping, the parameter for the proposed virtual cell ID may include a plurality of cell IDs or a plurality of parameters for replacing the cell IDs.

The parameter for the proposed virtual cell ID may include another parameter that can replace a value in association with a physical cell ID in the conventional DM-RS generation process in addition to a virtual cell ID having an integer value ranges from 0 to 503 in the same manner as the physical cell ID. In the conventional DM-RS generation process, the physical cell ID has an effect when generating a value $c_{init}$ used in the sequence hopping process, a value $c_{init}$ and sequence-shift pattern value $f_{ss}$ used in the sequence hopping process, a value $c_{init}$ used in the DM-RS sequence generation process, etc. That is, the three types of the values $c_{init}$, the value $f_{ss}$, etc., are determined by the physical cell ID in the conventional method, whereas are determined by the parameter for the virtual cell ID according to the method proposed in the present invention. Therefore, the parameter for the virtual cell ID may include not only the virtual cell ID but also some of the three types of values $c_{init}$ and the value $f_{ss}$. The three types of values $c_{init}$ each have different generation equations, and thus may be independently included in the parameter for the virtual cell ID. The parameter for the virtual cell ID proposed according to one embodiment may include a virtual cell ID for replacing the physical cell ID in the DM-RS sequence hopping and group hopping process and a value $c_{init}$ for replacing a value $c_{init}$ determined by the physical cell ID in the DM-RS sequence generation process.

The proposed virtual cell ID may be used when generating at least one of a PUSCH DM-RS and a PUCCH DM-RS. A different virtual cell ID may be used to generate each DM-RS.

The BS may report in advance information indicating whether the UE generates the DM-RS by using the physical cell ID or generates the DM-RS by using a parameter for the virtual cell ID, by adding the information to DCI or a higher layer signal such as an RRC message. Although only an example in which each UE performing MU-MIMO transmits the DM-RS by using the virtual cell ID is described in FIG. 8, the present invention is not limited thereto. That is, each UE may additionally transmit another uplink signal in addition to the DM-RS among uplink signals, by using the virtual cell ID.

Figure 10:
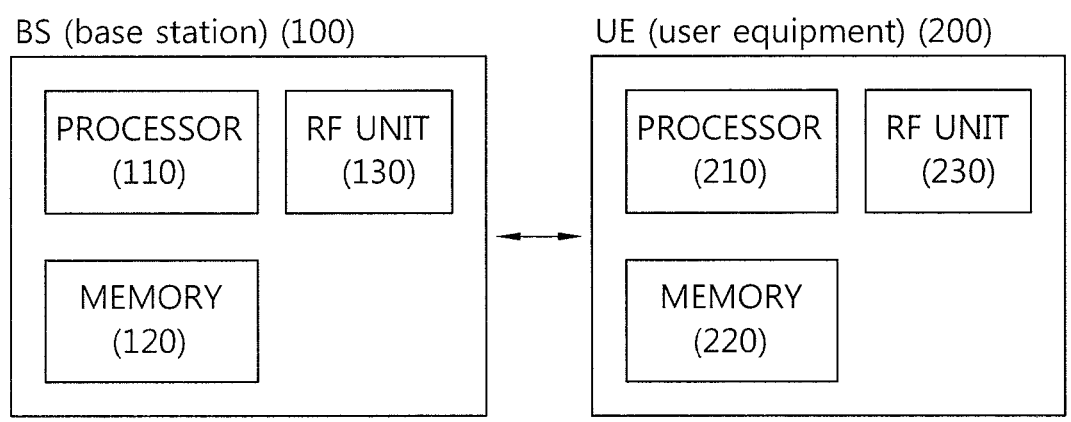
FIG. 10 shows a structure of a base station and a user equipment according to an embodiment of the present invention.

FIG. 10 shows a structure of a BS and a UE according to an embodiment of the present invention.

A BS 100 is an example of a node. The BS 100 includes a processor 110, a memory 120, and a radio frequency (RF) unit 130. The processor 110 implements the proposed functions, procedures, and/or methods. For example, the processor 110 transmits a parameter for a virtual cell ID to a UE by using a higher layer signal or a physical layer signal, and transmits scheduling information. The scheduling information may be scheduled such that MU-MIMO is performed in some regions of a PUSCH radio resource to which a plurality of UEs are allocated. In addition, the processor 110 reports a physical cell ID by using a synchronization signal. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 receives a physical cell ID from the BS by using a synchronization signal, and receives a parameter for a virtual cell ID by using a higher layer signal or a physical layer signal. The parameter for the virtual cell ID may be used to generate the virtual cell ID, and the virtual cell ID may be used to generate an uplink DM-RS sequence. That is, the processor 210 may generate some uplink signals by using the physical cell ID, and may generate the remaining uplink signals by using the virtual cell ID. The physical cell ID may be cell-specific (i.e., it may be specific for each cell), and the virtual cell ID may be node-specific (i.e., another node in the same cell may have a different virtual cell ID). The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for transmitting demodulation reference signals, performed by a user equipment, the method comprising:
receiving synchronization signals including a primary synchronization signal and a secondary synchronization signal;

transmitting a first demodulation reference signal based on a physical cell identity (ID) which is determined by the synchronization signals;

receiving a higher layer signal; and transmitting a second demodulation reference signal based on a virtual cell ID which is configured by the higher layer signal, wherein the second demodulation reference signal is transmitted in two slots in a subframe, one sequence group is selected in each of the two slots and the second demodulation reference signal is generated by cyclically shifting one base sequence selected in the selected sequence group, and wherein the one base sequence is determined based on the virtual cell ID.

2. The method of claim 1, wherein the higher layer signal is a radio resource control (RRC) message.

3. The method of claim 1, wherein the second demodulation reference signal is transmitted at a fourth and an eleventh single carrier-frequency division multiple access (SC-FDMA) symbols in an uplink subframe including 14 SC-FDMA symbols.

4. The method of claim 1, wherein the second demodulation reference signal is transmitted at third and ninth single carrier-frequency division multiple access (SC-FDMA) symbols in an uplink subframe including 12 SC-FDMA symbols.

5. The method of claim 1, wherein the second demodulation reference signal is a reference signal which is associated with a physical uplink shared channel (PUSCH).

6. A user equipment (UE) for transmitting demodulation reference signals, the UE comprising:

a radio frequency (RF) unit configured to transmit and receive a radio signal; and a processor coupled to the RF unit and configured to:

receive synchronization signals including a primary synchronization signal and a secondary synchronization signal, transmit a first demodulation reference signal based on a physical cell identity (ID) which is determined by the synchronization signals, receive a higher layer signal, and transmit a second demodulation reference signal based on a virtual cell ID which is configured by the higher layer signal, wherein the second demodulation reference signal is transmitted in two slots in a subframe, one sequence group is selected in each of the two slots and the second demodulation reference signal is generated by cyclically shifting one base sequence selected in the selected sequence group, and wherein the one base sequence is determined based on the virtual cell ID.

7. The UE of claim 6, wherein the higher layer signal is a radio resource control (RRC) message.

8. The UE of claim 6, wherein the second demodulation reference signal is transmitted at a fourth and an eleventh single carrier-frequency division multiple access (SC-FDMA) symbols in an uplink subframe including 14 SC-FDMA symbols.

9. The UE of claim 6, wherein the second demodulation reference signal is transmitted at third and ninth single carrier-frequency division multiple access (SC-FDMA) symbols in an uplink subframe including 12 SC-FDMA symbols.

10. The UE of claim 6, wherein the second demodulation reference signal is a reference signal which is associated with a physical uplink shared channel (PUSCH).

* * * * *